United States Patent
Martin

(10) Patent No.: US 8,840,242 B2
(45) Date of Patent: Sep. 23, 2014

(54) GLASSES STORAGE SYSTEM

(71) Applicant: Colin Martin, Indianapolis, IN (US)

(72) Inventor: Colin Martin, Indianapolis, IN (US)

(*) Notice: Subject to any disclaimer, the term of this patent is extended or adjusted under 35 U.S.C. 154(b) by 3 days.

(21) Appl. No.: 13/769,553

(22) Filed: Feb. 18, 2013

(65) Prior Publication Data

US 2014/0232979 A1    Aug. 21, 2014

(51) Int. Cl.
*G02C 5/14*    (2006.01)
*G02C 11/00*    (2006.01)

(52) U.S. Cl.
CPC ...... *G02C 5/14* (2013.01); *G02C 11/00* (2013.01); *G02C 5/146* (2013.01)
USPC ............... 351/111; 351/121; 351/158

(58) Field of Classification Search
CPC .......... G02C 5/14; G02C 5/143; G02C 5/146; G02C 11/00
USPC .................. 351/111, 119, 121, 158
See application file for complete search history.

(56) References Cited

U.S. PATENT DOCUMENTS

| | | | |
|---|---|---|---|
| 3,387,910 A * | 6/1968 | Giraldi | 351/113 |
| 3,647,059 A * | 3/1972 | Humphreys | 242/564 |
| 4,165,804 A | 8/1979 | Georgopoulos | |
| 4,212,386 A | 7/1980 | Maisonneuve | |
| 4,682,374 A * | 7/1987 | Geiser | 2/209 |
| D311,600 S | 10/1990 | Peracca | |
| 5,321,442 A | 6/1994 | Albanese | |
| 5,539,480 A * | 7/1996 | Rakoff et al. | 351/158 |
| 5,636,787 A | 6/1997 | Gowhari | |
| 5,969,787 A | 10/1999 | Hall et al. | |
| 6,247,811 B1 * | 6/2001 | Rhoades et al. | 351/156 |
| 6,305,798 B1 | 10/2001 | Whisenant | |
| 6,929,365 B2 | 8/2005 | Swab et al. | |
| 7,306,332 B2 | 12/2007 | Chen et al. | |

FOREIGN PATENT DOCUMENTS

EP    1 045 269    * 10/2000 ............. G02C 11/00

* cited by examiner

*Primary Examiner* — Huy K Mai
(74) *Attorney, Agent, or Firm* — Maschoff Brennan

(57) ABSTRACT

A system for storing small items. The system includes a glasses frame. The system also includes an earpiece, where the earpiece includes a hollow cavity.

20 Claims, 2 Drawing Sheets

GLASSES STORAGE SYSTEM

CROSS-REFERENCE TO RELATED APPLICATIONS

Not applicable.

BACKGROUND OF THE INVENTION

Small items, such as cigarettes, cash, toothpicks, pills or pencils, are often difficult for a user to carry. In particular, these items are often small enough that they become easily lost. For example, placing a pill in a pocket can allow the pill to be easily misplaced or otherwise lost. In contrast, events can lead to other problems, such as the pill being crushed, dissolved, difficult to locate and many other problems. This can lead to dangerous circumstances depending on the nature of the medication for both the individual who needs the medication and others in the area.

Because of these problems, people often turn to carriers. These are larger items that store the smaller items and make them easier to locate and more difficult to damage or lose. Nevertheless, this is an inconvenient solution as it requires the user to carry a large object simply to keep track of a small object, defeating the purpose of producing a small object.

However, these same users are often carrying other objects. These objects, such as keys, wallets, glasses, etc. make up a large part of people's lives and they expend great efforts to keep track of these items on a regular basis. This makes them ideal for storing other items. However, there is not a convenient place in many of these items for explicitly carrying other things.

Accordingly, there is a need in the art for a system capable of carrying small items. In addition, there is a need in the art for the system to be readily located. Further, there is a need in the art for the system to attach to or be integrated with another everyday item.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for storing small items. The system includes a glasses frame. The system also includes an earpiece, where the earpiece includes a hollow cavity.

Another example embodiment includes a system for storing small items. The system includes a glasses frame. The system also includes an earpiece, where the earpiece includes a hollow cavity. The system further includes an attachment, where the attachment is configured to attach the earpiece to the glasses frame.

Another example embodiment includes a system for storing small items. The system includes a glasses frame including two lenses to be held in place in front of the eyes of a user. The system also includes an earpiece, where the earpiece includes a hollow cavity. The system further includes an attachment, where the attachment is configured to attach the earpiece to the glasses frame.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
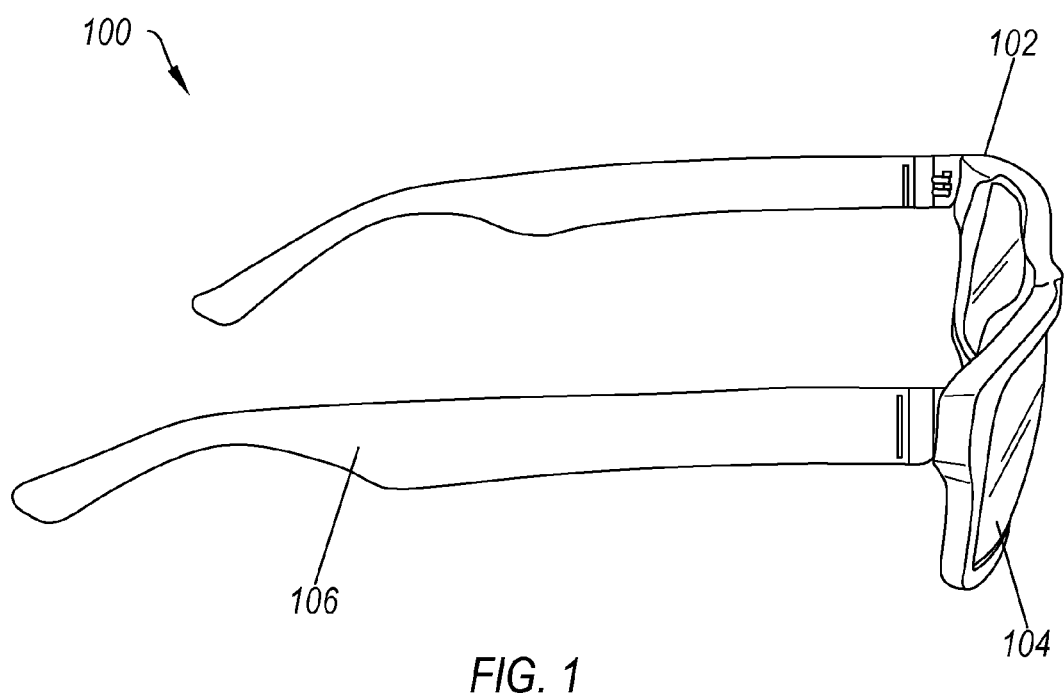
FIG. 1 illustrates an example of a glasses storage system.

FIG. 1 illustrates an example of a glasses storage system 100. The glasses storage system 100 can be used to store items within the glasses. For example, the system 100 can be used to store cigarettes, cash, toothpicks, pills, pencils or any other desired item. The glasses storage system 100 can include any desired type of glasses. For example, the glasses storage system 100 can include safety glasses, reading glasses, prescription glasses, sunglasses or any other desired glasses.

FIG. 1 shows that the glasses storage system 100 can include a frame 102. In at least one implementation, the frame 102 can be configured to position the glasses storage system 100 in the correct position while in use. For example, the frame 102 can be configured to fit snugly on the user's head in order to position the glasses storage system 100 for correct use. Additionally or alternatively, the frame 102 can include one or more nose pads. The nose pads can be configured to allow the frame 102 to rest on the user's nose, such that the glasses storage system 100 is positioned correctly while in use.

FIG. 1 further shows that the glasses storage system 100 can include one or more lenses 104. In at least one implementation, the one or more lenses 104 can be made of a transparent, or substantially transparent, material. As used in the specification, the term transparent shall mean that the material is capable of transmitting light so that objects or images can be seen as if there were no intervening material, unless otherwise specified. I.e., the user is able to see through the material without a substantial decrease in the amount of light which passes through the one or more lenses 104.

Additionally or alternatively, the one or more lenses 104 can prevent a portion of the light from passing through the one or more lenses 104. For example, the one or more lenses 104 can be tinted. In at least one implementation, tinting the one or more lenses 104 can include placing a film over the one or more lenses 104 which reduces the amount of light which is transmitted through the one or more lenses 104. Additionally or alternatively, the material itself can reduce the amount of light transmitted through the one or more lenses.

FIG. 1 additionally shows that the glasses storage system 100 can include an earpiece 106. The earpiece 106 can be configured to hold the frame 102 in place relative the user's ears. For example, the earpiece 106 can include a curved portion which is configured to be placed behind the user's ears. This can prevent the frame 102 from falling off when the user leans forward. The earpiece 106 can be between 120 mm and 150 mm in length. Additionally or alternatively, the earpiece 106 can include a storage cavity.

Figure 2:
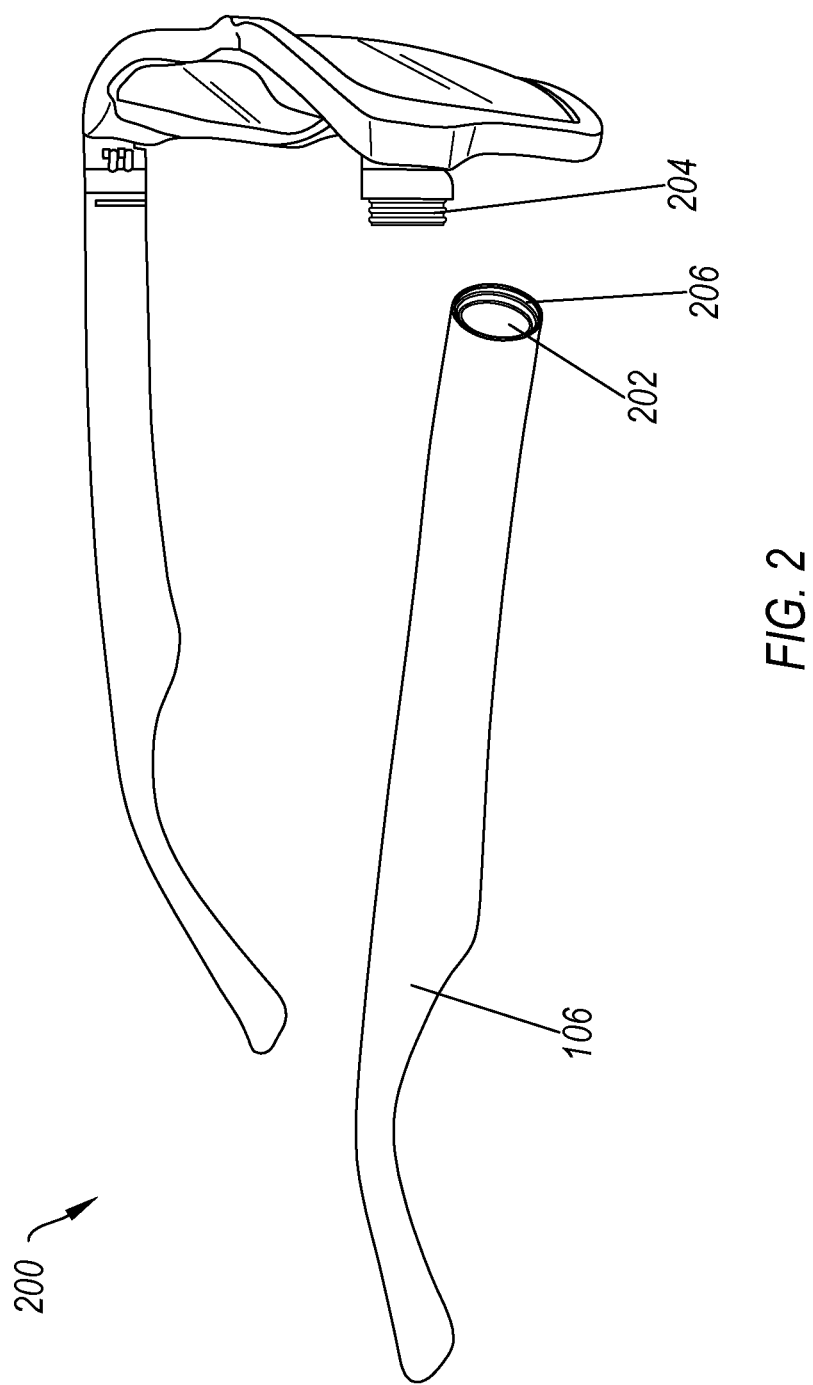
FIG. 2 illustrates an example of the glasses storage system with the earpiece removed.

FIG. 2 illustrates an example of the glasses storage system 100 with the earpiece 106 removed. Removing the earpiece 106 can allow the user to store small items within the earpiece. For example, cigarettes, cash, toothpicks, pills, pencils or any other desired item can be stored within the earpiece 106

FIG. 2 shows that the earpiece 106 can include a storage cavity 202. The storage cavity 202 can include a hollow portion which is configured to receive one or more items. The storage cavity 202 can be sized based on the items that the user wishes to store. For example, the storage cavity 202 can be between 70 mm and 110 mm in length. E.g., the storage cavity 202 can be approximately 90 mm in length. The cavity 202 can be circular in shape. For example, the diameter of the cavity 202 can be between 6 mm and 10 mm. E.g., the diameter of the cavity 202 can be approximately 8 mm. As used in the specification and the claims, the term approximately shall mean that the value is within 10% of the stated value, unless otherwise specified.

FIG. 2 also shows that the earpiece 106 can include an attachment 204. The attachment 204 can allow the earpiece 106 to be attached or detached from the frame 102 as desired. I.e., the attachment 204 can allow a user to remove the earpiece 106 to access the storage cavity 202 and/or attach the earpiece 106 to conceal the contents of the storage cavity 202. For example, the attachment 204 can include a flange, threading, a snap or any other desired attachment mechanism.

FIG. 2 further shows that the attachment 204 can include a gasket 206. The gasket 206 can prevent water or other debris from entering the storage cavity 202. For example, the gasket 206 can include a rubber washer, an O-ring or any other desired seal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A glasses storage system comprising:
a frame configured to position one or more lenses in front of one or both eyes of a user;
an earpiece configured to support the frame, the earpiece surrounding a hollow storage cavity that is defined internally to the earpiece; and
an attachment member configured to be permanently attached to the frame and configured to be releasably attached to the earpiece, the attachment member further configured to seal the hollow storage cavity when the attachment member is attached to the earpiece.

2. The glasses storage system of claim 1, wherein:
the earpiece includes a first portion configured to be positioned above and behind an ear of the user;
the earpiece includes a second portion configured to be positioned between the frame and the ear of the user; and
the hollow storage cavity is defined internally to the second portion of the earpiece.

3. The glasses storage system of claim 1, wherein an outside shape of an outside surface of the earpiece along a portion of the earpiece in which the hollow storage cavity is defined is substantially similar to an inside shape of an inside surface of the hollow storage cavity.

4. The glasses storage system of claim 3, wherein:
the outside shape and the inside shape are substantially cylindrical; and
the substantially cylindrical hollow storage cavity is substantially centered internally to the substantially cylindrical portion of the earpiece along a length of the earpiece.

5. The glasses storage system of claim 1, wherein:
the earpiece further defines a wall between the hollow storage cavity and an outside surface of the earpiece along a length of the earpiece; and
the wall has substantially equal thickness all around the hollow storage cavity at each point along the length of the earpiece.

6. The glasses storage of claim 1, wherein the attachment member is configured to seal the hollow storage cavity to substantially prevent water from entering hollow storage cavity.

7. The glasses storage system of claim 1, further comprising a second earpiece also configured to support the frame, the second earpiece surrounding a second hollow storage cavity that is defined internally to the second earpiece.

8. The glasses storage system of claim 1, wherein the attachment member is configured to be permanently attached to the frame via a hinge.

9. A glasses storage system comprising:
a frame configured to position one or more lenses in front of one or both eyes of a user;
an earpiece configured to support the frame, the earpiece defining a hollow storage cavity; and
an attachment member configured to be permanently attached to the frame and configured to be releasably attached to the earpiece, the attachment member further configured to seal the hollow storage cavity when the attachment member is attached to the earpiece to substantially prevent water from entering the hollow storage cavity.

10. The glasses storage system of claim 9, wherein the earpiece defines only a single opening into the hollow storage cavity.

11. The glasses storage system of claim 9, wherein the attachment member is further configured to seal the hollow storage cavity to substantially prevent air from exiting the hollow storage cavity.

12. The glasses storage system of claim 9, wherein the earpiece surrounds the hollow storage cavity and the hollow storage cavity is defined internally to the earpiece.

13. The glasses storage system of claim 9, further comprising a second earpiece also configured to support the frame, the second earpiece defining a second hollow storage cavity that is sealable to substantially prevent water from entering the second hollow storage cavity.

14. The glasses storage system of claim 9, wherein the attachment member is configured to be permanently attached to the frame via a hinge.

15. A glasses storage system comprising:
a frame configured to position one or more lenses in front of one or both eyes of a user;
an earpiece configured to support the frame, the earpiece defining a hollow storage cavity; and an attachment member configured to be permanently attached to the frame and configured to be releasably attached to the earpiece, the attachment member further configured to seal the hollow storage cavity when the attachment member is attached to the earpiece.

16. The glasses storage system of claim 15, wherein the attachment member is configured to be permanently attached to the frame via a hinge.

17. The glasses storage system of claim 15, wherein the attachment member is configured to be releasably attached to the earpiece via threads formed on a surface of the attachment member that are configured to mate with threads formed on a surface of the earpiece.

18. The glasses storage system of claim 15, wherein the attachment member is configured to be releasably attached to the earpiece via ribs and grooves.

19. The glasses storage system of claim 15, further comprising a rubber washer, O-ring, or gasket configured to be positioned between the attachment member and the earpiece to enable the attachment member to seal the hollow storage cavity to substantially prevent water from entering the hollow storage cavity when the attachment member is attached to the earpiece.

20. The glasses storage system of claim 15, further comprising:
- a second earpiece also configured to support the frame, the second earpiece defining a second hollow storage cavity; and
- a second attachment member configured to be permanently attached to the frame and configured to be releasably attached to the second earpiece, the second attachment member further configured to seal the second hollow storage cavity when the second attachment member is attached to the second earpiece.

* * * * *